United States Patent [19]

Hudgin et al.

[11] Patent Number: 4,533,685

[45] Date of Patent: Aug. 6, 1985

[54] POLYMER-METAL BLEND

[76] Inventors: Donald E. Hudgin, 33 Berkshire Dr., Princeton Junction, N.J. 08550; Mohammad A. Semsarzadeh, 32-10 Quail Ridge, Plainsboro, N.J. 08536

[21] Appl. No.: 517,442

[22] Filed: Jul. 26, 1983

[51] Int. Cl.³ .............................................. C08K 3/08
[52] U.S. Cl. .............................. 523/457; 106/193 M; 523/458; 523/459; 523/460; 523/512; 524/439; 524/440; 524/441
[58] Field of Search ...................... 524/439, 440, 441; 523/457, 458, 459, 460, 512, 307; 106/193 M, 198; 252/512, 513, 514, 515

[56] References Cited

U.S. PATENT DOCUMENTS

| | | | |
|---|---|---|---|
| 1,792,262 | 2/1931 | Wilson | 106/193 M |
| 2,502,949 | 4/1950 | Howlett | 524/408 |
| 2,543,536 | 2/1951 | Sherman | 106/193 R |
| 2,833,030 | 5/1958 | Peaslee | 228/199 |
| 2,947,646 | 8/1960 | Devaney et al. | 524/440 |
| 3,082,109 | 3/1963 | Devaney | 106/193 R |
| 3,716,609 | 2/1973 | Trocciola et al. | 524/441 |
| 4,029,630 | 6/1977 | Meinhold et al. | 524/439 |

FOREIGN PATENT DOCUMENTS

| | | | |
|---|---|---|---|
| 678341 | 1/1964 | Canada | 524/440 |
| 7065751 | 4/1982 | Japan . | |

Primary Examiner—Lewis T. Jacobs
Attorney, Agent, or Firm—Cushman, Darby & Cushman

[57] ABSTRACT

Metallized polymers are made by melting the metal and polymer together. The products have improved impact resistance and electrical and thermal conductivity. They can also be used for electromagnetic interference shielding.

32 Claims, 7 Drawing Figures

_Fig. 4._
_Fig. 5._
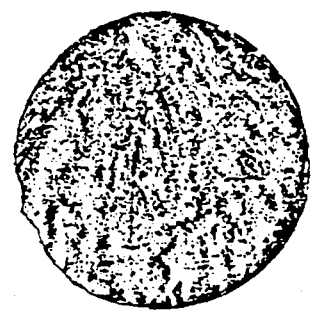
_Fig. 6._

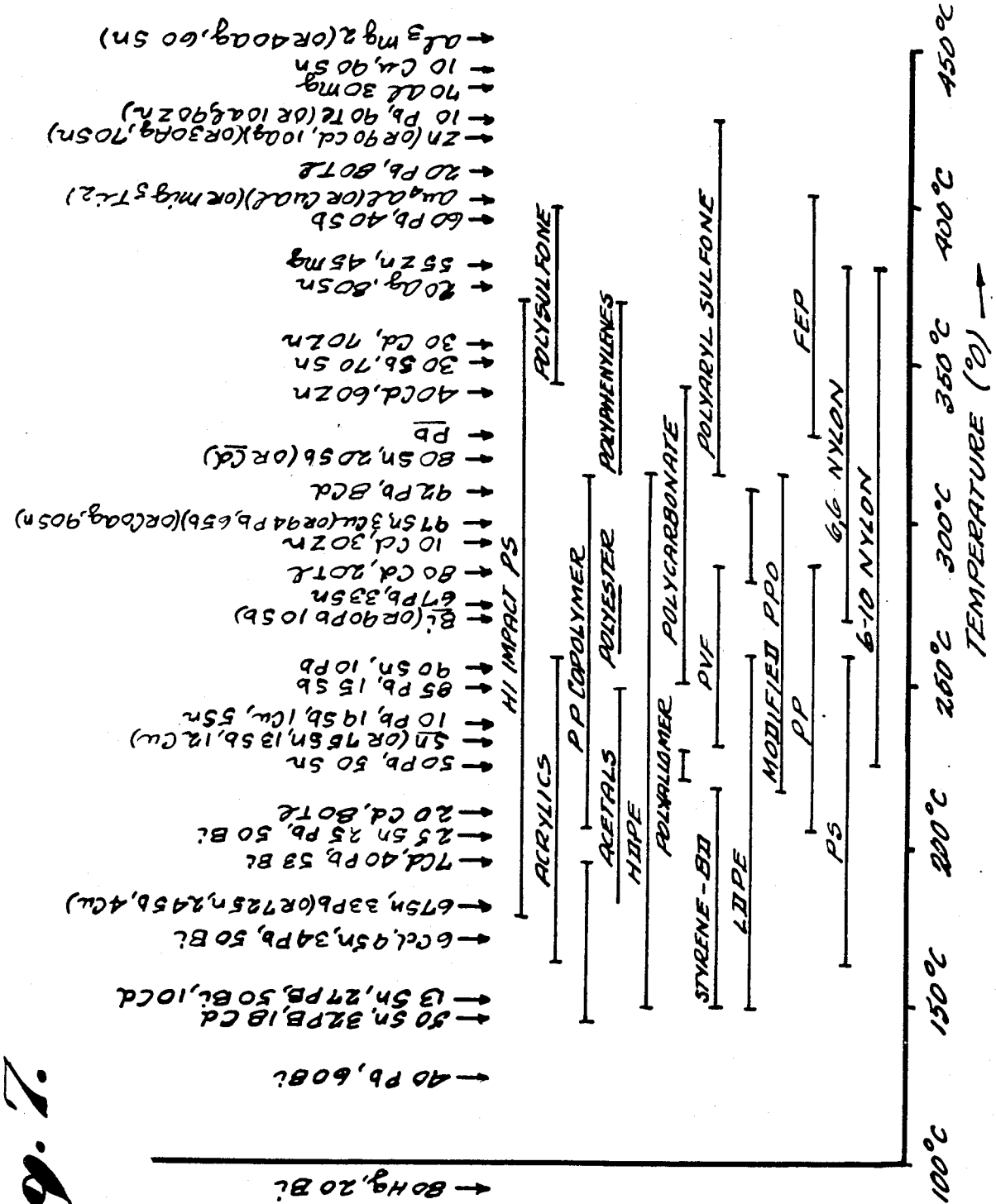

POLYMER-METAL BLEND

BACKGROUND OF THE INVENTION

Metal-polymer blends are well known. Many types of metals in the form of fibers, powders, flakes, etc. have been blended with various types of polymers to give blends that have useful properties. The metal incorporated into a polymer matrix have been those having melting points well above the process temperatures of the polymers used.

While such blends have many uses, they suffer from the disadvantage, for example, that continuous metal-to-metal contact cannot be maintained. Also, normal metal-polymer blends, where metal fibers and metal flakes are used, suffer during the processing step because the fiber or flakes are heavily damaged by the intensive mixing and shearing forces. This results in a product having poorer properties than could be had if the metal fibers of flakes had remained intact.

SUMMARY OF THE INVENTION

It has now been found that new metal-polymer blends can be produced by blending a molten polymer with a molten metal. Suitable metals, whether they be pure metals or metal alloys, are those that melt below the processing and/or decomposition temperature of the polymer in which the metal is incorporated. Since certain thermoplastic polymers melt as high as 430° C., they are potentially useful for blending with selected high melting metals or alloys.

For those polymers that are normally processed at lower temperatures, say 150° C. to 300° C., there is an extensive list of metal alloys that melt in this range in Metals Handbook, 9th edition (1979), Volume 2 "Properties and Selection: Non Ferrous Alloys And Pure Metals" prepared under the direction of the ASM Handbook Committee.

All that is necessary to know whether a particular metal can be used with a particular polymer is to know their respective melting or softening temperatures. Although a number of pure metals, such as bismuth, cadmium, gallium, lead, selenium, and tin, have melting points in the useful range, there are hundreds of known alloys of metals that have melting points in the useful range. Also, certain alloys of metals with nonmetals usually form eutectics, which melt, in most cases, at temperatures below those of any one of the pure metals. An example is a 70–30 Tin (M.Pt. 232° C.)—Lead (M.Pt. 328° C.) alloy which has a melting point of 192° C. Many alloys of three or more metals are also well known that have suitable melting points.

At present, alloys that appear to be most useful are those based on lead, tin, zinc, magnesium, aluminum. Combinations of these metals can give alloys melting in the 150° to 400° C. range. For this invention, other metals can be used as well, provided the alloys produced therefrom, melt below the polymer decomposition temperature.

FIG. 7 also illustrates suitable metal-polymer compositions.

Based on the Periodic Table of the Elements and the known melting point of their alloys, there can be used, for example, the following metals (or if the metal has too high a melting point, an alloy of the metal having a lower melting point): Na, K, Rb, Cs, Mg, Ca, Cr, Ir, Cu, Ag, Zn, Ga, Ge, Al, Si, Se, Cd, In, Sn, Sb, Hg, Tl, Pb, and Bi.

The process involves forming a molten pure metal or metal alloy during the processing step which results in strands of metal throughout the polymer matrix, resulting in a polymer blend showing an improvement in certain properties, such as impact resistance and electrical and thermal conductivity. It has been found, for example, that a metal-polymer composition prepared according to the invention that only contains 50% of metal conducts as well as pure metal. (This effect also is not noted in conventional blending of a polymer and metal). The metal appears to be continuously touching over long distances. In the processing, the metal stretches out to form a fibrous type of material. (If metal is simply blended with polymer in conventional manner, this does not occur).

The term polymer as used herein is intended to cover three main different types of materials.

1. Thermoelastic materials (elastomers), e.g., natural rubber, styrene-butadiene rubber, acrylonitrile-butadiene rubber, polybutylene, ethylene-propylene rubber, ethylene-propyleneterpolymer rubber (EPT), e.g., ethylene-propylenenorbornadiene, polyurethane elastomers, polyester elastomers, or butyl rubber.

2. Thermoplastic, e.g., polyethylene (low density to high density), polypropylene, polyamides, e.g., nylon 6,6, nylon-6, nylon 6,10, linear polyimides, polyvinyl chloride, saran, polybenzimidazoles, polycarbonates, polysulfones, e.g., polyphenyl sulfone, linear polyurethane, polyether sulfone, perfluoroethylene-perfluoropropylene copolymer (FEP), Teflon (polytetrafluoroethylene), vinyl chloride-vinyl acetate copolymer, polyphenylene oxide, polyphenylene sulfide, polyacrylates and methacrylates, e.g., polymethyl methacrylate, polyethyl acrylate, polybutyl acrylate, polybutyl methacrylate, poly 2-ethylhexyl acrylate, polyacrylic acid, 2-hydroxyethyl acrylate polymers, polyvinylidene fluoride, and, ABS (acrylonitrilebutadiene-styrene terpolymer).

3. Thermosetting polymers (i.e., before they are cured or set) e.g., epoxy resins bisphenol A-epichlorhydrin condensation product, urea-formaldehyde, melamine-formaldehyde, phenolformaldehyde, unsaturated polyesters, e.g., ethylene glycol-adipate-maleate, modified with styrene or diallyl phthalate, or tris(hydroxyethyl isocyanurate-ethylene glycol terephthate, thermosetting polyurethanes, thermosetting alkyd resins.

Although this invention involves a metal-polymer composition produced by blending a molten metal and a molten polymer, selected fillers may also be added before, during, or after the basic blending step. These fillers include, for example, such materials as clay, calcium carbonate, various minerals, mica, carbon black, fiber glass, and other fibrous materials, e.g., carbon fibers. There are many choices, and the choice will be based on properties desired in the finished product as well as the economics.

If metallic fillers, such as metal powder, fibers, or flakes, are used with the metal-polymer blend of the type described above, certain properties can be improved beyond those of the metal-polymer blend alone. For example, electrical and thermal conductivity shows considerable improvement.

The products of the invention can be used in bearing and bonding applications.

Metal dispersed in a polymer as a composite can make a strong bond to metal surfaces thus eliminating cohesive failure at the interface, and eliminating low bearing strength of composites due to low tensile shear strength, thus giving higher and better performance. Corrosion resistance is increased due to the hiding of the metals in the polymer. Surface abrasion is reduced by strong adhesion of the metal to the polymer or rubber.

The thermal and electrical conductivity properties are such as to make the products very useful for electromagnetic interference shielding (EMI shielding). Effectiveness for this purpose is directly related to the conductivity of the material.

Additionally, the products of the invention can be used in electroplating of metal onto the product with a resultant strong bond between the surface metal and the polymer.

The compositions of the invention can comprise, consist essentially of, or consist of the stated materials; and the process can comprise, consist essentially of the recited steps with such materials.

BRIEF DESCRIPTION OF THE DRAWINGS

FIG. 4 is a top plan view of a pressed out metal-polyurethane article made according to the invention;

FIG. 5 is a top plan view of a metal-polypropylene disc made according to the invention;

FIG. 6 is a top plan view of a metal-Teflon (polytetrafluoroethylene) bar made according to the invention; and FIG. 7 is a chart showing the correlation between suitable combinations of metals (including alloys) and polymers.

DETAILED DESCRIPTION

Figure 1:
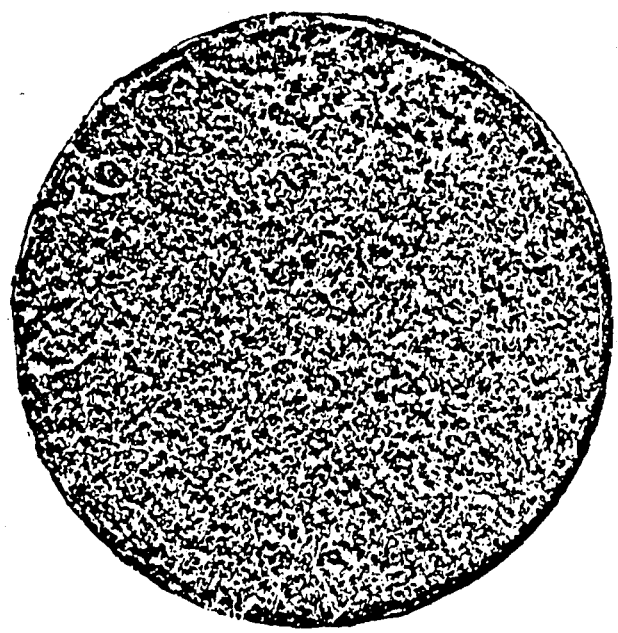
FIG. 1 is a top plan view of a molded conductive metal-rubber (polybutylene) article prepared according to the invention.
Figure 2:
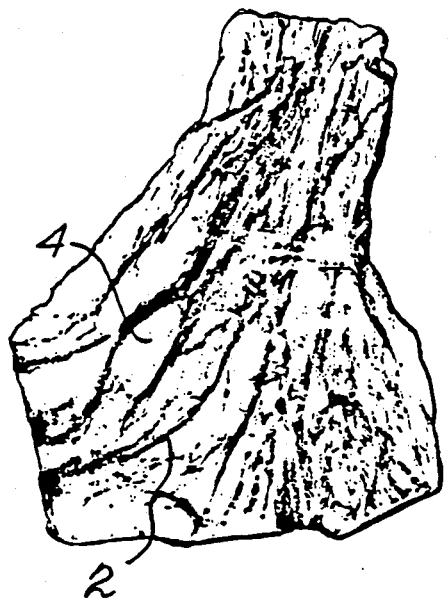
FIG. 2 is a top plan view of a compression molded metal-polyurethane article.
Figure 3:
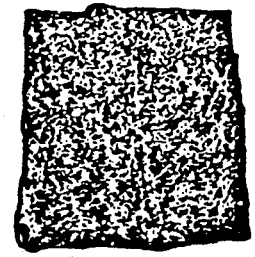
FIG. 3 is a top plan view of a cured metal-polyurethane elastomer article (without precure) prepared according to the invention.

FIG. 2 shows quite clearly how the metal 2 forms long connecting threads in the clear matrix 4 of the polyurethane.

FIG. 7 shows the relative melting points of a large number of alloys and metals and also the melting or softening range of a number of polymers. The standard symbols are used for the metals. In the recitation of the polymers, the abbreviations are as follows:

PS = polystyrene
HDPE = high density polyethylene
Styrene-BD = styrene-butadiene copolymer
PVF = polyvinyl fluoride
LDPE = low density polyethylene
Modified PPO = modified polyphenylene oxide
PP = polypropylene
FEP = perfluorinated-ethylene-propylene copolymer
Polyphenylene S = polyphenylene sulfide
PP Copolymer = ethylene-propylene copolymer While usually the articles of the invention are prepared using 20-50% of metal based on the total weight of metal and polymer, the metal can be from 5 to 70% of the total of metal and polymer.

EXAMPLE 1

Fifty grams of particulate polyethylene (Exxon chem. LD 606, MI 30, Density 0.920, was tumbled with 20 grams powdered low melting point eutectic metal alloy mesh size 0.42 mm (sieve No. 40) with the following percent compositions: %Pb=44.5, %Bi=55.5 for about 20 minutes at a rotation of 20 RPM at about 100° C. to disperse the metal particles on the polyethylene.

The mixture was placed over a 0.250 gram thin layer carbon black mat (100% carbon, ¾" fiber length, 0.20 OZ/Yd² of paper, supplied by International Paper Company) and covered with another layer of carbon black mat in a circular mold cavity and compression molded at 160° C. at a pressure of 37 tons for 10 minutes. The molding is above the melting point of the alloy and of the polyethylene. The mold was then cooled to room temperature under 20,000 lbs pressure. The circular disc had the dimension of 0.25" thickness and 4" diameter. With two standard aluminum sample holders connected to Sencore V.O.A, the disc showed D.C resistivity of 15 Ohms. A.C resistivity of the sample was measured by Heathkit Oscilloscope Model 10-4205 connected to Heathkit Sin-Square Audio Generator Model IG-5218 through the same aluminum sample holders as the reference. The A.C resistivity of the molded disc was the same as the reference sample holder from 10 to 20,000 HZ frequencies.

EXAMPLE 2

Fifty grams of particulate polypropylene (Hercules, Profax, SA 861, MI5, Density 0.897) was tumbled with 20 grams of powdered low melting point eutectic metal alloy mesh size 0.42 mm (sieve No. 40) with the following percent compositions: %Pb=44.5, %Bi=55.5 for about 20 minutes at a rotation of 20 RPM at about 100° C.

The mixture was placed in a circular mold cavity and compression molded at 180° C. at a pressure of 37 tons for 10 minutes. The mold was then cooled at room temperature under 20,000 lbs pressure. The circular disc had the dimensions of 0.25" thickness and 4" diameter. With two standard aluminum sample holders connected to Sencore V.O.A, the disc showed a D.C resistivity of 20 Ohms. A.C resistivity of the sample was measured by Heathkit Oscilloscope Model 10-4205 connected to Heathkit Sin-Square Audio Generator Model IG-5218 through the same aluminum sample holders as the reference. The A.C resistivity of the molded disc was the same as the reference sample holder from 10 to 20,000 HZ frequencies.

EXAMPLE 3

Fifty grams of particulate ABS (Borg Warner, Cycolac ABS, natural KJB 1000) was tumbled with 20 grams of powdered low melting point eutectic metal alloy mesh size 0.42 mm (sieve No. 40) with the following percent compositions: %Pb=44.5, %Bi=55.5 for about 20 minutes at a rotation of 20 RPM at about 100° C.

The mixture was placed over a 0.250 gram thin layer carbon black mat (100% carbon, ¾" fiber length, 0.20 OZ/Yd² weight of paper, supplied by International Paper Company) and covered with another layer of carbon black mat in a circular mold cavity and compression molded at 200° C. at a pressure of 37 tons for 10 minutes. This temperature is above the melting point of the alloy and above the softening temperature of ABS. The mold was then cooled to room temperature under 20,000 pounds pressure. The circular disc had the dimensions of 0.25" thickness and 4" diameter. With two standard aluminum sample holders connected to Sencore V.O.A, the disc showed D.C resistivity of 15 Ohms. A.C resistivity of the sample was measured by Heathkit Oscilloscope Model 10-4205 connected to Heathkit Sin-Square Audio Generator Model IG-5218 through the same aluminum sample holders as the reference. The A.C resistivity of the molded disc was the same as the reference sample holder from 10 to 20,000 Hz frequencies.

EXAMPLE 4

Fifty grams of particulate ABS (Borg Warner, cycolac ABS Black, KJB 4051) was tumbled with 20 grams of powdered low melting point eutectic metal alloy mesh size 0.42 mm (sieve No. 40) with the following percent compositions: %Pb=44.5, %Bi=55.5 for about 20 minutes at a rotation of 20 RPM at about 100° C.

The mixture was placed over a 0.250 gram thin layer carbon black mat (100% carbon, $\frac{3}{4}''$ fiber length, 0.20 OZ/Yd$^2$ weight of paper, supplied by International Paper Company) and covered with another layer of carbon black mat in a circular mold cavity and compression molded at 200° C. at a pressure of 37 tons for 10 minutes. The mold was then cooled to room temperature under 20,000 pounds pressure. The circular disc had the dimensions of 0.25" thickness and 4" diameter. With two standard aluminum sample holders connected to Sencore V.O.A, the disc showed D.C resistiity of 15 Ohms. A.C resistivity of the sample was measured by Heathkit Oscilloscope Model 10-4205 connected to Heathkit Sin-Square Audio Generator Model IG-5218 through the same aluminum sample holders as the reference. The A.C resistivity of the molded disc was the same as the reference sample holder from 10 to 20,000 HZ frequencies.

EXAMPLE 5

Fifty grams of particulate polybutylene (Shell, 8640 Series MII=1.0, D=0.90) was tumbled with 20 grams of powdered low melting point eutectic metal alloy mesh size 0.42 mm (sieve No. 40) with the following percent compositions: %Pb=44.5, %Bi=55.5 for about 20 minutes at a rotation of 20 RPM at about 100° C.

The mixture was placed over a 0.250 gram thin layer carbon black mat (100% carbo, $\frac{3}{4}''$ fiber length, 0.20 OZ/Yd$^2$ weight of paper, supplied by International Paper Company) and covered with another layer of carbon black mat in circular mold cavity and compression molded at 130° C. at a pressure of 37 tons for 10 minutes. This is above the melting point of the alloy and the softening point of the polybutylene. The mold was then cooled to room temperature under 20,000 lbs pressure. The circular disc had the dimensions of 0.25" thickness and 4" diameter. With two standard aluminum sample holders connected to Sencore V.O.A, the disc showed D.C resistivity of 15 Ohms. A.C resistivity of the sample was measured by Heathkit Oscilloscope Model 10-4205 connected to Heathkit Sin-Square Audio Generator Model IG-5218 through the same aluminum sample holders as the reference. The A.C resistivity of the molded disc was the same as the reference sample holder from 10 to 20,000 HZ frequencies.

EXAMPLE 6

Twenty grams of low melting alloy with the composition %Bi=44.7, %Pb=22.6, %Sn=8.3., %Cd=5.3, %In=19.1, m.p=46.8° C. supplied from Belmont Metal Inc. was melted around 50° C. in a small beaker and added to 127 grams of liquid polyurethane prepolymer of Uniroyal (Vibrathane 8011, type B-602, Ester-TDI, Stoichiometry 95%, %NCO=3.3) containing 4.27 grams Trimethylol propane (6% TMP in 1,4 butane diol) in a second beaker. The admixture was vigorously agitated for thorough mixing and poured into a stainless steel pan. The air bubbles were removed in a vacuum oven at about 50° C. and portions were taken and treated as following:

A—A portion of the partially polymerized sample was stretched while still warm; so that the molten alloy stretched into continuous strands of metal; it was allowed to cool and cure in room temperature. The thin film had an appearance similar to that in FIG. 2.

B—Another portion of partially polymerized sample was cut then pressed with a Carver Lab. Press under 10,000 LBs. pressure for 24 hours at room temperature to cure into a metal alloy-polyurethane composition.

The remainder of the sample in the stainless steel pan was divided into two parts. One was allowed to cure at about 50° C. for 24 hours, and the other stayed at room temperature for 4 days. The compositions thus formed were then removed from the pans.

EXAMPLE 7

Fifty grams of particulate polyether sulfone (Victorex, Grade 200 P, ICI American Inc.) was tumbled with 20 grams powdered metal alloy of %Zn=95, %Al=5 of 375° C. melting point and mesh size of 0.84 mm (Sieve No. 20) for about 20 minutes at a rotation of 20 RPM at about 150° C.

The mixture was then placed into the barrel of a ram injection molding machine equipped with a mold of disc shape cavity of 4.8 cm. diameter and 0.4 cm thickness. The barrel was heated to 380° C., and the mixture was injected under 600 Psi after the temperature equilibration. The injected disc was taken out after cooling. With two standard aluminum sample holders connected to Sencore V.O.A, the injected disc showed D.C surface resistivity of 28 Ohms.

EXAMPLE 8

Eighty grams of particulate polyurethane (Pellethane, urethane elastoplastics, UpJohn, 2362-80AE) was tumbled with 20 grams of powdered metal alloy of %Sn=80, %Zn=8, % Mg=5.40, %Al=6.60 of 230° C. melting point and mesh size of 0.149 mm (Sieve No. 100) for about 20 minutes at a rotation of 20 RPM at about 100° C.

The mixture was then placed into the barrel of a ram injection molding machine equipped with a cold mold of disc shape cavity of 4.8 cm. diameter and 0.4 cm. thickness. The barrel was heated to 230° C., and the mixture was injected under 400 Psi after the temperature equilibration. The injected disc was taken out after cooling. With two standard aluminum sample holders connected to Sencore V.O.A, the injected disc showed D.C surface resistivity of 9 ohm.

What is claimed is:

1. Electrically conducting metallized organic polymer blend prepared by melting the metal with the polymer, the metal having a melting point within the softening to molten range of the polymer.

2. Electrically conducting metallized polymer blend according to claim 1 wherein the polymer is a thermoplastic resin.

3. Electrically conducting metallized polymer blend according to claim 1 wherein the polymer is a thermosetting polymer.

4. Electrically conducting metallized thermoset polymer blend prepared by curing the metallized polymer of claim 3.

5. Electrically conducting metallized polymer blend according to claim 1 containing 20 to 50% by weight of the metal based on the total of polymer and metal.

6. A composition consisting essentially of the electrically conducting metallized organic polymer blend of claim 1.

7. A composition comprising the electrically conducting metallized organic polymer blend of claim 1 and a filler.

8. A composition comprising the electrically conducting metallized organic polymer blend of claim 1 containing a fibrous filler.

9. A composition comprising the electrically conducting metallized organic polymer blend of claim 1 containing a non-fibrous filler.

10. A blend according to claim 1 wherein the metal is 5 to 70% of the total of metal and polymers.

11. Electrically conducting metallized polymer blend prepared by melting both the metal and the polymer.

12. Electrically conducting metallized polymer according to claim 11 wherein the polymer is a thermoplastic resin.

13. Electrically conducting metallized polymer according to claim 11 wherein the polymer is an elastomer.

14. Electrically conducting metallized polymer according to claim 11 wherein the polymer is a thermosetting resin.

15. Electrically conducting metallized thermoset polymer blend prepared by curing the metallized polymer of claim 14.

16. Electrically conducting metallized polymer blend according to claim 11 containing 20 to 50% by weight of the metal based on the total of polymer and metal.

17. A composition consisting essentially of the electrically conducting metallized organic polymer blend of claim 11.

18. A composition comprising the electrically conducting metallized organic polymer blend of claim 11 and a filler.

19. A composition comprising the electrically conducting metallized organic polymer blend of claim 11 and a fibrous filler.

20. A composition comprising the electrically conducting metallized organic polymer blend of claim 11 and a non-fibrous filler.

21. A blend according to claim 11 wherein the metal is 5 to 70% of the total of metal and polymer.

22. A process of preparing an electrically conducting metallized plastic blend comprising incorporating a molten metal in an organic polymer matrix at a temperature within the softening to molten range of the polymer and continuing the incorporation until the blend is electrically conducting.

23. A process according to claim 22 comprising working the metal into strands of metal throughout the polymer matrix.

24. A process according to claim 22 comprising intimately mixing particles of the metal with particles of the polymer prior to melting the metal.

25. A process according to claim 22 comprising melting the metal prior to admixing with the polymer.

26. A process according to claim 25 wherein the molten metal is mixed with molten polymer.

27. An electrically conducting metallized organic polymer blend according to claim 1 wherein the metal is present in fibrous form.

28. An electrically conducting metallized organic polymer blend according to claim 27 wherein the fibrous metal is in the form of strands of metal which are continuously touching over long distances throughout the polymer matrix.

29. An electrically conducting metallized polymer blend according to claim 1 containing about 50% of metal and having about the same electrically conductivity as 100% of the same metal.

30. An electrically conducting metallized organic polymer blend according to claim 1 having a DC resistivity of not more than 28 ohms measured on a sample in the form of a disc having a diameter of 4.8 centimeter and a thickness of 0.4 centimeter and held by aluminum sample holders.

31. An electrically conducting metallized organic polymer blend according to claim 30 wherein the metal of the blend is present in fibrous form.

32. An electrically conducting metallized organic polymer blend according to claim 31 wherein the fibrous metal is in the form of strands of metal which are continuously touching over long distances throughout the polymer matrix.

* * * * *